May 31, 1927.
H. I. SHIRE
1,630,807
INDICATOR FOR AUTOMOBILE CIRCUITS
Filed March 7, 1921 2 Sheets-Sheet 1
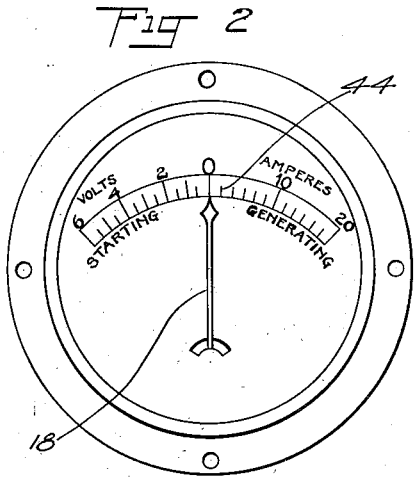
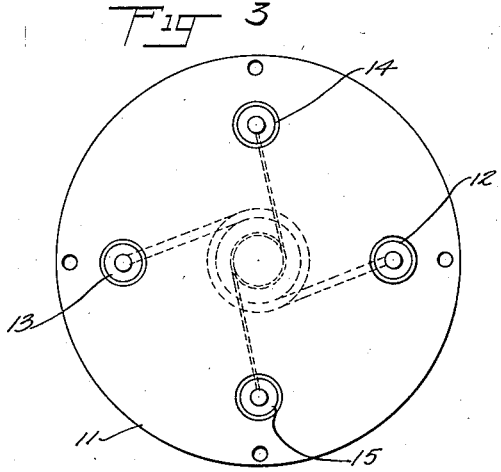
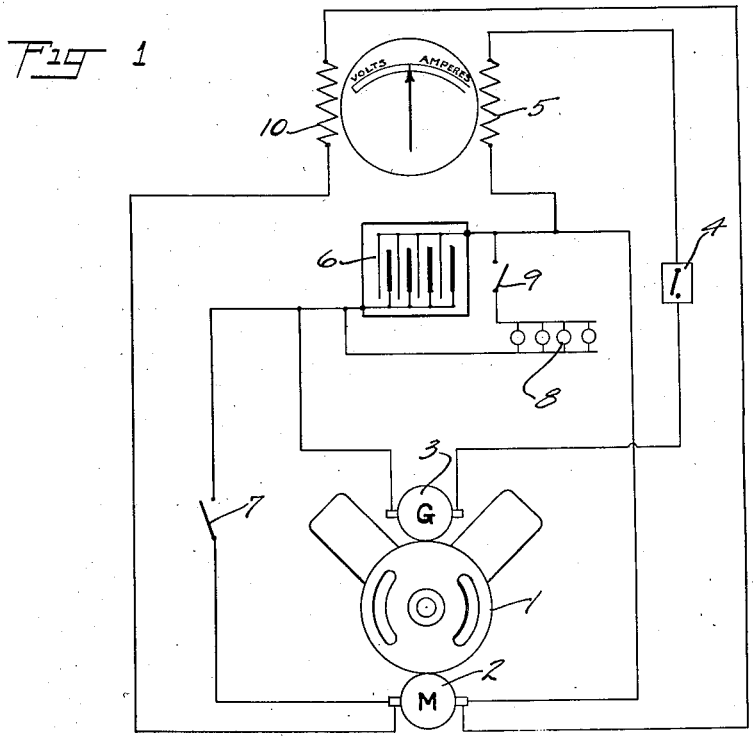
Harry I. Shire, Inventor
By his Attorney Thomas Howe May 31, 1927.
H. I. SHIRE
1,630,807
INDICATOR FOR AUTOMOBILE CIRCUITS
Filed March 7, 1921
2 Sheets-Sheet 2
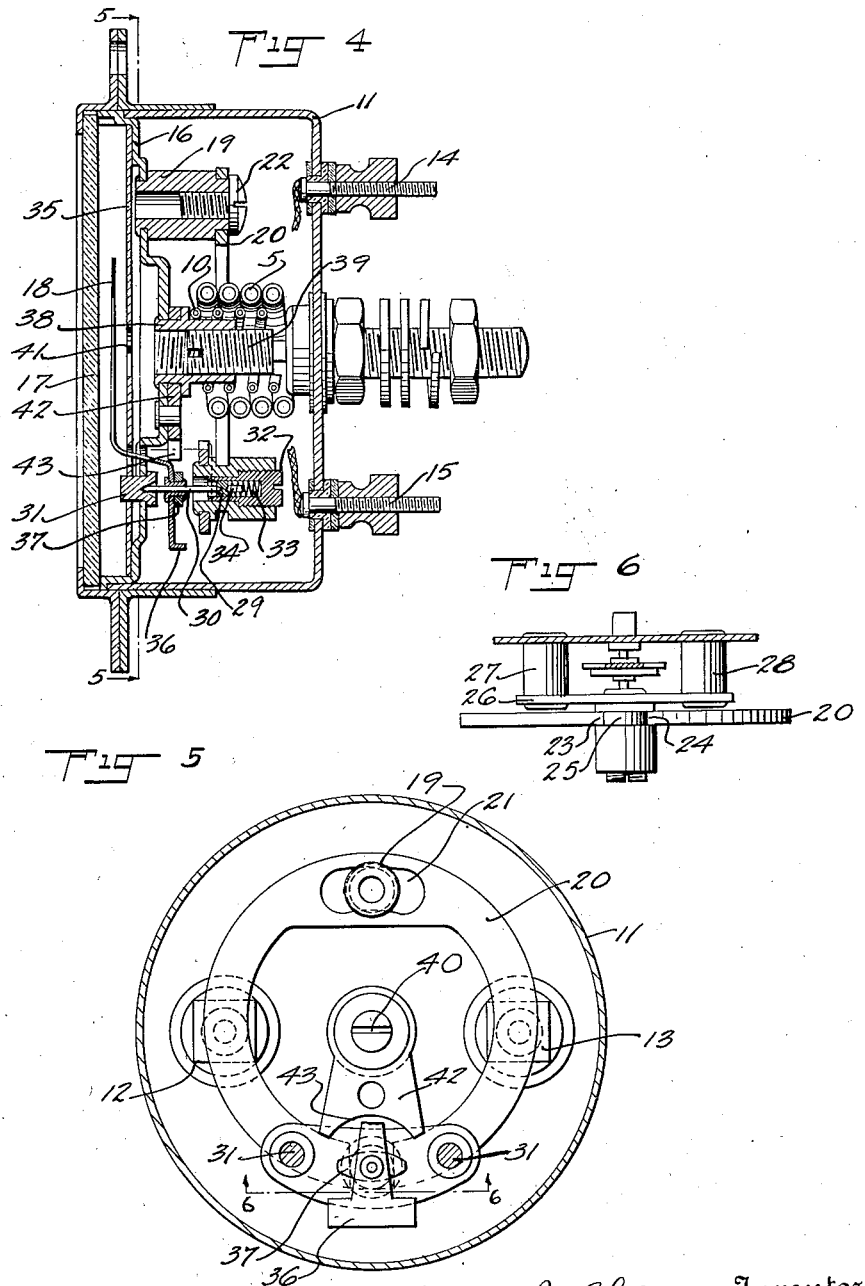

Patented May 31, 1927.

1,630,807

UNITED STATES PATENT OFFICE.

HARRY I. SHIRE, OF DETROIT, MICHIGAN.

INDICATOR FOR AUTOMOBILE CIRCUITS.

Application filed March 7, 1921. Serial No. 450,478.

This invention relates to the indication of conditions in the starting and generating circuits of automobiles, but it is also useful in other applications.

As is well known, the internal combustion engine employed for propelling a motor vehicle is not self starting but requires to be "cranked". It is now quite usual to employ a motor for initially driving or "cranking" the engine. It is also usual to employ a storage battery for supplying current to the motor during the starting operation and a generator which, when the engine has been placed in operation, supplies current to the storage battery so that the latter is kept charged for such use as may be required of it.

The connection of the storage battery in driving relation to the motor, and its disconnection therefrom, is effected by means of a "starting" switch and the connection of the generator with the battery is controlled by a reverse current switch which operates to prevent the battery from discharging itself through the generator when the latter is at the lower voltage but permits current to be supplied from the generator to the battery. Sometimes a single dynamo electric machine is employed to function both as starting motor and generator, and at other times two machines are used, one functioning as a motor and the other as a generator. In either case there is a starting circuit and a generator circuit controlled as indicated.

As is well understood by those skilled in the art, the generator circuit is not in operation to supply current when the starting circuit is brought into operation, and the starting circuit is open when the engine has been started and the generator circuit has come into operation.

It is one object of the present invention to provide a unitary indicating means whereby the operator may observe conditions in the starting and generating circuits of an automobile, or any analogous circuits, by a glance at one location.

A further object of the invention is to take advantage of the alternative operation of circuits such as the starting and generating circuits of an automobile to utilize a common indicator for denoting conditions of both circuits.

In order that the indications corresponding to the starting and generating conditions respectively may be differentiated in a striking manner and yet adapted to be associated together in a single indicating means, it is a further object of the invention to provide a system having an indicating instrument having a zero position, the indicator moving in one direction from the zero position to indicate starting conditions and in the other direction from said position to indicate generating conditions.

As will hereinafter appear, the voltage across the starting motor and the current flowing in the generator circuits are eloquent indexes of the starting and generating conditions, and it may be stated to be a further object of the invention to provide indicating means for these conditions which is effected by the voltage across the starting motor and the current through the generator.

A further object of the invention is to so relate the indicating means to the circuits in relation to which indications are to be provided, that there will be no undue wasting of current in the indicating means.

A further object of the invention is to provide a construction of indicating instrument which is well adapted for the character of indications above referred to.

Other and ancillary objects of the invention will appear hereinafter.

In the accompanying drawings which illustrate the invention—

Fig. 1 is a diagram of apparatus and electrical connections of the circuit arrangements of an automobile, embodying the invention;

Fig. 2 is a face view of an instrument as employed in the system of Fig. 1;

Fig. 3 is a rear elevation of the instrument as shown in Fig. 2;

Fig. 4 is a central longitudinal section of the instrument of Figs. 2 and 3;

Fig. 5 is a section on the line 5—5 of Fig. 4; and

Fig. 6 is a section on the line 6—6 of Fig. 5.

Referring to the drawings, the apparatus comprises an internal combustion engine 1 in driving relation to which is mechanically connected the starting motor 2 while the generator 3 is mechanically connected to be driven by the engine.

One terminal of the generator is connected through the reverse current switch 4 (which may be automatic in operation as is well understood in the art) and through the ampere coil 5 of the indicating instrument to one terminal of the storage battery 6. The other terminal of the storage battery is connected with the other terminal of the generator. Also one terminal of the storage battery is connected through the starting switch 7 with one terminal of the motor, while the other terminal of the motor is connected with the other terminal of the battery. Lights 8 such as the head and tail lights or other desired lights, are connected across the terminals of the storage battery through a switch 9 whereby the light circuit may be made and broken. Connected across the terminals of the motor is the volt coil 10 of the indicating instrument.

By reference to Figs. 2 to 6 inclusive the structure of the indicating instrument may now be set forth.

It comprises a casing 11 having in its back two insulated studs 12 and 13 to the inner ends of which are connected the terminals of the ampere coil 5 and also two insulated studs 14 and 15, to the inner ends of which are connected the terminals of the voltage coil 10, these two coils being concentric as shown. As is well understood in the art, a circuit of a voltage coil either by the resistance of the coil 10 or resistance placed in series therewith, is of a comparatively high resistance so as to take a very small current while ampere coils such as 5 are of comparatively low resistance.

Within the front of the casing is fitted a brass mechanism plate 16 in front of which is secured the glass plate 17 through which the indicating pointer 18 is observed.

Mounted upon a brass post 19 which is secured to the mechanism plate 16 is a permanent steel magnet 20 of the horseshoe type. The magnet is secured to the upper end of the post 19 which passes through the slot 21 by means of a screw 22. The poles 23 and 24 bear against a brass post 25 which is mounted in a plate 26 which in turn is mounted upon the posts 27 and 28 mounted in the mechanism plate 16. Sliding within the post is a bearing 29 for the staff 30, the other end of the staff engaging in a bearing 31 in the mechanism plate 16. The bearing surfaces for the staff are of the usual conical type familiar in electric meter and instrument structures.

The pressure upon the bearings may, however, be adjusted by means of the plug 32 screw-threaded into the top of the post 25, a spring 33 being interposed between the plug and the bearing 29 as shown. By screwing down on the plug and putting the spring under greater or less compression, the pressure between the bearings and the ends of the staff or spindle may be made any that is desired. The friction introduced by causing pressure of the bearing 29 upon the end of the staff 30 may be employed as a damping means for the indicating needle so that it may be dead beat.

It is to be observed that the end of the staff cannot leave its bearing 31 because the bearing 29 cannot travel sufficiently far toward the right (see Fig. 4) to permit the end of the staff to withdraw from the bearing 31, the projection 34 coming against the bottom of the recess in the plug 32 and positively arresting any further movement before it has moved far enough to permit withdrawal of the end of the staff from the bearing 31.

Fixed upon the staff so as to turn therewith is the pointer 18 moving over the dial plate 35 and having a counter weight portion 36 which serves to balance the indicating end about the staff. Also fixed upon the staff is the armature 37 of magnetic material mounted below the gap between the poles of the permanent magnet so as to be acted upon by the flux between the poles, whereby the magnet tends to set its greatest length across the gap as shown in Fig. 5.

Within the coils 5 and 10 extends a magnetic core comprising a sleeve 38 of magnetic material in which is screw-threaded a member 39 of magnetic material whereby the magnetic circuit of the coils may be adjusted. The front end of this member has a slot 40 for a screw driver which may be reached by inserting the screw driver into the forward end of the sleeve 38, a hole 41 being provided in the dial plate 35.

The coil also comprises a member 42 of good magnetic material secured to the mechanism plate and in intimate magnetic relation to the sleeve 38. This member 42 terminates in a pole piece 43 in proximity to the armature 37.

The armature and consequently the pointer 18 will take up a position which will depend upon the resultant action of the magnetism of either the coil 5 or the coil 10 (whichever is carrying current at the time) and of the flux of the permanent magnet. The relative effects of the two magnetisms upon the armature may be made to vary by screwing the member 39 back and forth and thereby altering the magnetic circuit of the coil 5 and consequently its effect upon the armature.

By reference particularly to Figs. 1 and 2, it will be seen that the scale 44 for the pointer 18, which scale is mounted upon the dial plate 35, has its zero point in the central position, and is calibrated to the left of that position to indicate starting conditions (in this case volts) and to the right of the zero position to indicate generating conditions (in this case amperes). The pointer 18 is adjusted to the zero position when no current is flowing in either of the coils 5 or 10 and the volt coil 10 connected across the motor is so wound and connected that, when current is supplied to operate it as a motor, it tends to cause a deflection of the pointer 18 to the left (Fig. 2) thereby indicating the volts across the starting motor and starting conditions as will be hereinafter further observed.

The ampere coil 5 connected in series with the generator is so wound and connected that when current is supplied from the generator it will tend to displace the pointer 18 to the right (Fig. 2) and indicate the amperes flowing in the generator circuit whereby the generating conditions are indicated as will be again referred to.

To note the operation of the apparatus, if it be assumed that the engine is stationary, if the starting switch 7 be closed, current will be supplied to the motor from the battery and the instrument will give indication as follows:

If, when the starting switch is closed, the instrument shows no deflection it will be evident that the circuit has failed in some particular either as to the source of supply (the battery) or that the circuit is open at a defective contact or elsewhere, and the trouble will have to be located and remedied before the starting operation can be effected.

If, when the instrument indicates six volts or more (the full open circuit battery voltage) there is afforded an indication that practically the entire voltage drop in the battery circuit is in the motor which indicates that there is an open circuit in the starting motor.

Should the voltage indicate steadily below three volts (with approximately a six volt battery) the starter has probably stalled, due to a weak battery or possibly because of poor contacts in the circuit. If the voltage indicated is well above three volts (with approximately a six volt battery) and vibrates (which vibration is due to the rising and the falling of the load on the motor as the pistons pass compression) the operation is normal. Also the voltage reading under these conditions indicates the state of charge of the battery, the reading being about five volts on a six volt battery when fully charged and correspondingly less according to the amount which the battery has been discharged.

If, with the starting switch closed, as described, the voltage indicated is well above the three volts and reads steadily (without pulsation) the indication is that the engine is not turning (because the vibration due to the passage of the pistons by compression is lacking) in other words the indication is that for some reason there is an excessive load on the starting motor which has caused it to stall.

It is further to be observed that the voltage coil is disconnected from the battery by the opening of the starting switch after the motor has served its purpose and so current does not wastefully flow through the volt meter coil. This coil is cut out of circuit and receives no current except when the starting motor is operated.

It is also to be observed that when the engine is at rest the generator is not in operation and the reverse current switch 4 is open to prevent back flow of current from the battery through the generator. The circuit of the ampere coil 5 is therefore open. When, therefore, the starting motor and the voltage coil 10 are active the ampere coil 5 is inactive, and on the other hand after the engine has become started so that the generator circuit comes into operation and the coil 5 is made active there is no occasion for the use of the starting motor and the starting switch is open so that the voltage coil 10 is inactive. A single indicating means is thus employed to respond to alternative conditions, the one being inactive while the other is in operation.

When the engine has been set in operation, the starting switch 7 opened and the reverse current switch 4 closed, the current flowing in the generator circuit will cause a deflection of the pointer 18 to the right (Fig. 2) of the zero position and show the number of amperes flowing in the generator circuit from which it will appear whether or not the current delivered is normal for the speed at which it is running. Further an indication will be afforded as to whether or not the reverse current switch is properly operating. If, when the engine and generator are at rest and the switch is open, the pointer 18 should deflect to the left of the zero position (Fig. 2) it is an indication that the reverse current switch has failed to act and that the battery is discharging through the generator because the reverse current switch has failed to operate or has become short circuited, the deflection of the pointer upon the opposite side of the zero position from the calibrated ampere readings indicating that the current is flowing reversely in the generator circuit, that is that the battery is discharging through the generator.

While in the illustration chosen we have shown the preferred embodiment of the invention including voltage indications with relation to the starter and ampere indications with relation to the generator, it will be understood by those skilled in the art, in view of the foregoing disclosure, that the indications of the starter and generator conditions may be associated by different specific means within the generic scope of the present invention, thus the coil 10 for the starter circuit might be made a low resistance ampere coil, or a high resistance coil with a shunt in the starter circuit in series with the starting motor starting switch and the battery, such coil being arranged and connected so as to deflect the pointer, when the current flows from the battery to the motor, in a direction opposite to that in which the pointer is deflected by the coil 5 when current flows from the generator to the battery, and many other modifications might be made within the scope of the present invention. The invention is not, therefore, limited to the structures shown in the drawings.

What I claim is:

1. The combination with an internal combustion engine, of a starting motor connected in driving relation thereto, a storage battery, means for connecting said battery across the terminals of said motor, a generator connected in driving relation to said engine, means for connecting said storage battery to said generator to charge the same, an indicating instrument comprising a movable pointer, a scale having an intermediate zero position and calibrated on one side of said zero position to read in volts and on the other side of said position to read in amperes and a plurality of coils acting upon said pointer, one of said coils being connected across the terminals of said motor and the other of said coils being connected in series between said generator and battery, said coils being so wound and connected that current supplied from the battery to the starting motor causes the said pointer to move in one direction from said zero position and current through the coil in the generator circuit flowing from the generator to the battery causes said pointer to move in the opposite direction from said zero position, a starting switch for connecting and disconnecting said motor and the instrument coil connected across its terminals in and from operative relation to said battery and a reverse current switch adapted to connect and disconnect said generator with said battery.

2. The combination with a motor, of a storage battery, means for connecting said battery across the terminals of said motor, means operated according to voltage connected across the terminals of said motor, a generator, means for connecting said generator across the terminals of said battery, means operated according to amperes in the circuit of said generator and battery, an indicating means common to said voltage and ampere operated means, a starting switch for connecting and disconnecting said motor and voltage operating means to and from said battery and a switch for connecting and disconnecting said generator with said battery.

3. The combination with a motor, of a battery, means for connecting said battery across the terminals of said motor, a generator, means for connecting said generator across the terminals of said battery and a unitary structure comprising volt and ampere indicating means and means for operatively relating the said structure to said motor and battery to indicate volts and to said generator and battery to indicate its current.

4. The combination with an internal combustion engine, of a starting circuit therefor including a dynamo electric machine for driving said engine, a starting switch for closing the circuit of an electrical source of supply through said machine, a storage battery adapted to supply current to said dynamo electric machine, means for connecting said storage battery with said dynamo electric machine, a generator circuit including a dynamo electric machine driven by said engine, and a reverse current switch in the circuit of the battery and generator, a unitary structure of indicating means, means for operatively relating said indicating means to said starting circuit and means for operatively relating said indicating means to said generator circuit, said means for operatively relating said indicating means to said starting and generator circuits being controlled by said starting and reverse current switches respectively.

5. The combination with an internal combustion engine, of a starting circuit including a dynamo electric machine, driving connections between said engine and dynamo electric machine, a storage battery, a generator circuit including a dynamo electric machine, driving means between said engine and the last mentioned dynamo electric machine, an indicator having a pointer with an intermediate zero position, a scale for said pointer calibrated to indicate generator operation on one side of said position and to indicate starter operation on the other side of said position, means operated according of said position, means operated according to volts and means operated according to amperes respectively moving said pointer over the portion calibrated to indicate starter and generator operations and means for operatively relating said voltage and ampere operated means to said starting and generator circuits respectively.

In testimony whereof I have signed this specification this 3rd day of March 1921.

HARRY I. SHIRE.